United States Patent
DeLuca et al.

(10) Patent No.: US 9,003,300 B2
(45) Date of Patent: Apr. 7, 2015

(54) VOICE RESPONSE UNIT PROXY UTILIZING DYNAMIC WEB INTERACTION

(75) Inventors: Lisa Seacat DeLuca, San Francisco, CA (US); Travis M. Grigsby, Austin, TN (US); Frank L. Jania, Chapel Hill, NC (US); Steven M. Miller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1228 days.

(21) Appl. No.: 12/245,212

(22) Filed: Oct. 3, 2008

(65) Prior Publication Data

US 2010/0088613 A1 Apr. 8, 2010

(51) Int. Cl.
 G06F 3/0481 (2013.01)
 H04M 3/493 (2006.01)
 H04M 1/253 (2006.01)

(52) U.S. Cl.
 CPC ............ *H04M 3/493* (2013.01); *H04M 1/2535* (2013.01)

(58) Field of Classification Search
 USPC ........................................................ 715/746
 See application file for complete search history.

(56) References Cited

U.S. PATENT DOCUMENTS

| | | | |
|---|---|---|---|
| 5,097,528 A * | 3/1992 | Gursahaney et al. ...... | 379/88.21 |
| 5,864,605 A | 1/1999 | Keshav | |
| 5,946,377 A | 8/1999 | Wolf | |
| 6,131,810 A | 10/2000 | Weiss et al. | |
| 6,249,809 B1 * | 6/2001 | Bro ............................... | 709/217 |
| 6,354,490 B1 | 3/2002 | Weiss et al. | |
| 6,412,073 B1 | 6/2002 | Rangan | |
| 6,456,699 B1 * | 9/2002 | Burg et al. .................. | 379/88.17 |
| 6,587,822 B2 * | 7/2003 | Brown et al. .................. | 704/275 |
| 6,668,043 B2 * | 12/2003 | Hyziak et al. ................... | 379/52 |
| 6,788,770 B1 | 9/2004 | Cook et al. | |
| 6,965,664 B1 * | 11/2005 | McIntosh et al. ............... | 379/52 |
| 7,065,188 B1 | 6/2006 | Mei et al. | |
| 7,180,985 B2 | 2/2007 | Colson et al. | |
| 7,215,743 B2 | 5/2007 | Creamer et al. | |
| 7,272,212 B2 | 9/2007 | Eberle et al. | |
| 7,340,040 B1 | 3/2008 | Saylor et al. | |
| 7,386,103 B1 | 6/2008 | Chahal | |
| 7,505,965 B2 | 3/2009 | Ivanov | |
| 7,515,695 B1 * | 4/2009 | Chan et al. .................. | 379/88.18 |
| 7,535,998 B2 * | 5/2009 | Reynolds ................... | 379/88.18 |
| 7,542,902 B2 | 6/2009 | Scahill et al. | |
| 7,573,985 B2 * | 8/2009 | McClelland et al. ........... | 379/52 |
| 7,715,531 B1 | 5/2010 | Golding et al. | |
| 7,715,547 B2 | 5/2010 | Ibbotson et al. | |
| 7,730,135 B2 * | 6/2010 | Petrovykh ...................... | 709/205 |
| 7,742,580 B2 | 6/2010 | Cooper et al. | |
| 7,768,447 B2 * | 8/2010 | Pryszo et al. .................. | 342/176 |
| 7,773,731 B2 | 8/2010 | Malik et al. | |
| 7,778,397 B2 | 8/2010 | Erhart et al. | |
| 7,813,485 B2 * | 10/2010 | Yin et al. .................... | 379/88.13 |

(Continued)

FOREIGN PATENT DOCUMENTS

| | | |
|---|---|---|
| KR | 20000072653 | 12/2000 |
| KR | 10-0451097 | 12/2004 |

*Primary Examiner* — Reza Nabi
(74) *Attorney, Agent, or Firm* — Jordan IP Law, LLC

(57) ABSTRACT

A system, method and program product for providing a voice response unit (VRU) proxy. A system is provided that includes: a graphical user interface (GUI) for dynamically displaying information from a VRU and for receiving data from a user; a system for initiating a call with the VRU; and a VRU interface system for transmitting data from the user to the VRU, and for using speech recognition to capture broadcasts from the VRU for display within the GUI.

20 Claims, 3 Drawing Sheets

(56) References Cited

U.S. PATENT DOCUMENTS

| | | |
|---|---|---|
| 7,881,443 B2 | 2/2011 | Langseth et al. |
| 7,908,381 B2 * | 3/2011 | Koch et al. .................... 709/227 |
| 7,929,562 B2 * | 4/2011 | Petrovykh .................... 370/429 |
| 7,962,644 B1 * | 6/2011 | Ezerzer et al. ................. 709/238 |
| 7,970,110 B2 * | 6/2011 | Reynolds ................... 379/88.18 |
| 7,996,251 B2 * | 8/2011 | Kannan et al. ............... 705/7.13 |
| 8,046,220 B2 | 10/2011 | Agarwal et al. |
| 8,051,369 B2 | 11/2011 | Zirngibl et al. |
| 8,054,952 B1 | 11/2011 | Or-Bach et al. |
| 8,073,112 B2 | 12/2011 | Jaiswal et al. |
| 8,131,524 B2 | 3/2012 | Bushey et al. |
| 8,189,756 B2 | 5/2012 | Bhogal et al. |
| 8,290,125 B2 * | 10/2012 | Grigsby et al. ............ 379/88.18 |
| 2002/0077819 A1 | 6/2002 | Girardo |
| 2003/0005076 A1 * | 1/2003 | Koch et al. .................... 709/217 |
| 2003/0072420 A1 * | 4/2003 | Feigenbaum ................... 379/52 |
| 2003/0125952 A1 * | 7/2003 | Engelke et al. ............... 704/260 |
| 2003/0161449 A1 | 8/2003 | Plan |
| 2004/0093211 A1 * | 5/2004 | Reynolds et al. ............. 704/235 |
| 2004/0122941 A1 * | 6/2004 | Creamer et al. ............. 709/224 |
| 2004/0176958 A1 | 9/2004 | Salmenkaita et al. |
| 2004/0218737 A1 * | 11/2004 | Kelly ......................... 379/88.18 |
| 2005/0033582 A1 | 2/2005 | Gadd et al. |
| 2005/0069102 A1 * | 3/2005 | Chang ....................... 379/88.18 |
| 2005/0147219 A1 | 7/2005 | Comerford |
| 2005/0201544 A1 * | 9/2005 | Book et al. .................... 379/219 |
| 2006/0285652 A1 * | 12/2006 | McClelland et al. ........... 379/52 |
| 2006/0285657 A1 | 12/2006 | Lippke et al. |
| 2006/0285662 A1 * | 12/2006 | Yin et al. .................... 379/88.16 |
| 2006/0287866 A1 | 12/2006 | Cross et al. |
| 2007/0025529 A1 * | 2/2007 | Romeo ....................... 379/88.14 |
| 2007/0061132 A1 | 3/2007 | Bodin et al. |
| 2007/0081655 A1 | 4/2007 | Sun et al. |
| 2007/0123223 A1 * | 5/2007 | Letourneau et al. ........ 455/414.1 |
| 2007/0133521 A1 * | 6/2007 | McMaster ..................... 370/352 |
| 2007/0295803 A1 * | 12/2007 | Levine et al. ................. 235/379 |
| 2008/0039010 A1 | 2/2008 | Vance et al. |
| 2008/0046363 A1 * | 2/2008 | Ali et al. .......................... 705/40 |
| 2008/0089489 A1 * | 4/2008 | Katkam et al. ............. 379/88.13 |
| 2008/0109226 A1 * | 5/2008 | Gao et al. .................... 704/270.1 |
| 2008/0249936 A1 | 10/2008 | Miller et al. |
| 2009/0003578 A1 * | 1/2009 | Jain et al. ................. 379/211.01 |
| 2009/0094283 A1 | 4/2009 | Baudisch et al. |
| 2009/0154678 A1 * | 6/2009 | Kewin et al. .............. 379/201.01 |
| 2010/0054430 A1 * | 3/2010 | Grigsby et al. ............. 379/88.03 |
| 2010/0057456 A1 * | 3/2010 | Grigsby et al. ................ 704/235 |
| 2010/0067670 A1 * | 3/2010 | Grigsby et al. ............. 379/88.18 |
| 2010/0088613 A1 | 4/2010 | Deluca et al. |
| 2010/0185449 A1 | 7/2010 | Wu et al. |
| 2010/0208873 A1 * | 8/2010 | Chambers ........................ 379/52 |
| 2010/0217591 A1 * | 8/2010 | Shpigel ......................... 704/235 |
| 2010/0310059 A1 | 12/2010 | Davis et al. |
| 2011/0009096 A1 * | 1/2011 | Rotsztein et al. ........... 455/412.1 |
| 2011/0173119 A1 | 7/2011 | Kumar et al. |
| 2012/0213343 A1 * | 8/2012 | Gao et al. .................... 379/88.01 |
| 2012/0232897 A1 * | 9/2012 | Pettyjohn et al. ............. 704/235 |
| 2012/0314848 A1 * | 12/2012 | Grigsby et al. ............. 379/88.01 |
| 2014/0059429 A1 * | 2/2014 | Gao et al. ....................... 715/716 |

* cited by examiner

_(1)_
VOICE RESPONSE UNIT PROXY UTILIZING DYNAMIC WEB INTERACTION

CROSS-REFERENCE TO RELATED APPLICATION

This application is related to co-pending application entitled VOICE RESPONSE UNIT MAPPING, filed on Sep. 2, 2008, Ser. No. 12/202,691, co-pending application entitled VOICE RESPONSE UNIT SHORTCUTTING, filed on Sep. 2, 2008, Ser. No. 12/202,682, and co-pending application entitled VOICE RESPONSE UNIT HARVESTING, filed on Sep. 16, 2008, Ser. No. 12/211,653, the contents of which is hereby incorporated by reference.

FIELD OF THE INVENTION

This disclosure relates to voice response unit (VRU) telephony, and more particularly to a system and method for providing a VRU proxy utilizing dynamic web interaction.

BACKGROUND OF THE INVENTION

In telephony, interactive voice response (IVR) provides a phone technology that allows a computer or voice response unit (VRU) to detect voice and touch tones using a normal phone call. The VRU can respond with pre-recorded or dynamically generated audio to further direct callers on how to proceed. VRUs can be used to control almost any function where the interface can be broken down into a series of simple menu choices or options. Once constructed, VRUs generally scale well to handle large call volumes.

In operation, a caller dials a telephone number that is answered by the VRU. The VRU executes an application which is tied to the number dialed DNIS (Dialed Number Identification Service). As part of the application, prerecorded audio files or dynamically generated Text to Speech (TTS) audio explain the options available to the caller. The caller is given the choice to select options using DTMF tones or spoken words. Speech recognition may be used to carry out more complex transactions and simplifies the application menu structure.

Unfortunately, interfacing with a VRU can be annoying for people as the presentation of information is inherently slow. Moreover, users may have no, or limited access to a telephone for interacting with the VRU, e.g., the user may be hearing impaired, or be at a location with limited cellular coverage. Accordingly, there is a need in the art for allowing users to more effectively interact with VRUs without relying on a telephone.

SUMMARY OF THE INVENTION

The present invention relates to a system, method and program product for providing a VRU proxy system that allows a user to interface with a VRU via a graphical user interface on a networked device. In one embodiment, there is a voice response unit (VRU) proxy system, comprising: a graphical user interface (GUI) for dynamically displaying information from a VRU and for receiving data from a user; a system for initiating a call with the VRU; and a VRU interface system for transmitting data from the user to the VRU, and for using speech recognition to capture broadcasts from the VRU for display within the GUI.

In a second embodiment, there is a computer readable medium having a program product stored therein for providing a voice response unit (VRU) proxy system, comprising: program code for dynamically displaying information from a VRU on a graphical user interface (GUI) and for receiving data from a user via the GUI; program code for initiating a call with the VRU; program code for transmitting data from the user to the VRU; and program code for capturing broadcasts from the VRU using speech recognition for display within the GUI.

In a third embodiment, there is a method of providing a voice response unit (VRU) proxy, comprising: initiating a call with a VRU; using speech recognition to collect information broadcast from the VRU; dynamically displaying information from the VRU on a graphical user interface (GUI); receiving data from a user via the GUI; and transmitting the data from the user to the VRU.

In a fourth embodiment, there is a method for deploying a system for providing a voice response unit (VRU) proxy, comprising: providing a computer infrastructure being operable to: dynamically display information from a VRU on a graphical user interface (GUI) and receive data from a user via the GUI; initiate a call with the VRU; transmit data from the user to the VRU; and capture broadcasts from the VRU using speech recognition for display within the GUI.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
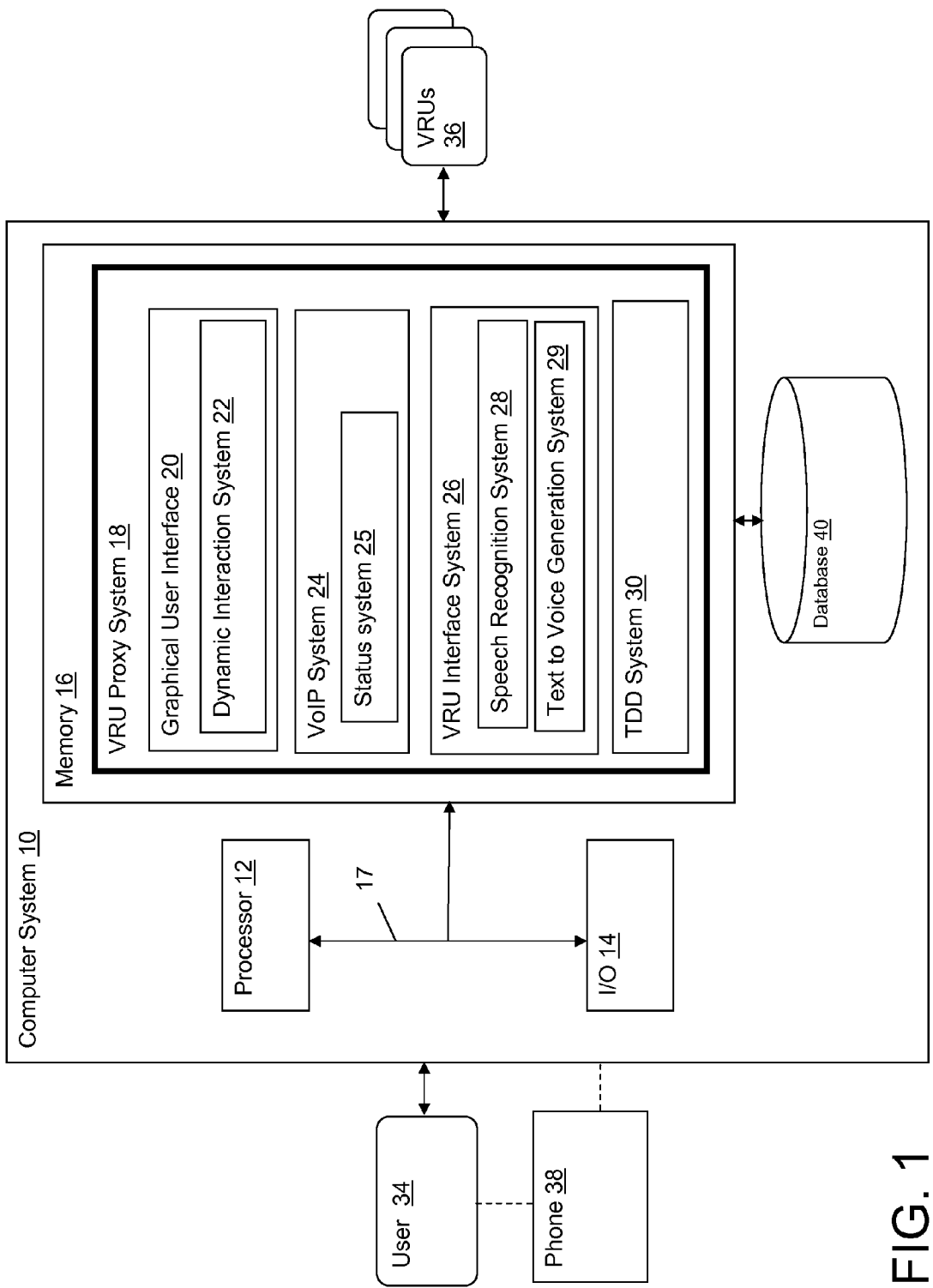
FIG. 1 depicts a computer system having a VRU proxy system in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Referring to FIG. 1, a computer system 10 is shown having a VRU (voice response unit) proxy system 18 that allows a user 34 to communicate with a VRU 36 via a graphical user interface (GUI) 20, such as a webpage, a handheld device display, etc., via a computer network. Thus, the GUI 20 acts as a proxy and eliminates the need for the user 34 to be on a telephone to navigate and interact with the VRU 36, unless the user needs to speak with a live representative. As described in further detail herein, GUI 20 includes a dynamic interaction system 22 that will dynamically display VRU data being broadcast (i.e., spoken) by the VRU 36. User 34 can then submit responsive information via the GUI 20. Thus, for example, if the VRU 36 recites four options (e.g., "press 1 for account balances, press 2 to make a payment, press 3 to change your billing address or press 4 to speak with a representative"), dynamic interaction system 22 dynamically generates and displays the four selectable options within the GUI 20 for the user 34. The user 34 can then simply select the appropriate option displayed within the GUI 20.

To operate the VRU proxy system 18, user 34 inputs a VRU 36 into the GUI 20, e.g., by visiting a proxy website and then: entering a VRU phone number, selecting the VRU 36 from a drop-down menu, etc. Voice over internet protocol (VoIP) system 24 then initiates a call to the VRU 36. VRU interface system 26 utilizes a speech recognition system 28 to textually capture what is being broadcast by the VRU 36. In general, the broadcast will include a set of selectable options (e.g., "press 1 for account balances . . . ), a request for information (e.g., "enter your account number"), or some VRU data (e.g., your account balance is . . . ). In any case, dynamic interaction system 22 dynamically parses and formats the data for display within GUI 20. In the case where user 34 is presented with a set of selectable options, a set of radio buttons or other selection mechanism is provided to allow user 34 to select an option via the GUI 20. VRU interface system 26 then transmits the selected option back to the VRU 36, either as a set of DTMF tones or as spoken information generated by text to voice generation system 29. Note that while this illustrative embodiment is described utilizing a VoIP system 24, any type of system for initiating and processing telephone calls may be utilized.

In another instance, VRU 36 may ask the user the user 34 to speak or enter their account number into the phone. Dynamic interaction system 22 may then generate a webpage form with a blank space for the user 34 to enter an account number in the GUI 20. Once the account number is entered, VRU interface system 26 can convert the account number to voice using the text to voice generation system 29 for recital back to the VRU 36, or use DTMF tones to provide the information.

In the case where the user 34 selects an option to speak with a representative, VoIP system 24 would automatically initiate a second call and connect the VRU 36 to a phone 38 associated with the user 36. If the VRU proxy system 18 was implemented on a smart phone, the VoIP system 24 would simply complete the second call to the smart phone. Also, in the case where there was a wait to speak with the representative, status system 25 could be utilized to delay the second call and provide the user with an updatable status until a representative was available. Thus, for instance, GUI 20 may display a message "Waiting time for next available representative=8 minutes," and not initiate the second call until a representative was available.

A TDD (Telecommunication Device for the Deaf) system 30 may also be incorporated for persons with hearing disabilities, which would automatically route calls to a TDD if a representative was needed.

A database 40 may also be included to store relevant information, such as common VRUs 36, common or favorite options within a VRU 36, typical navigation paths through the VRU 36, etc. In related case, VOICE RESPONSE UNIT MAPPING, filed on Sep. 2, 2008, Ser. No. 12/202,691, a system was disclosed for mapping existing VRUs 36. The information stored in database 40 could be used to facilitate such a mapping process.

Figure 2:
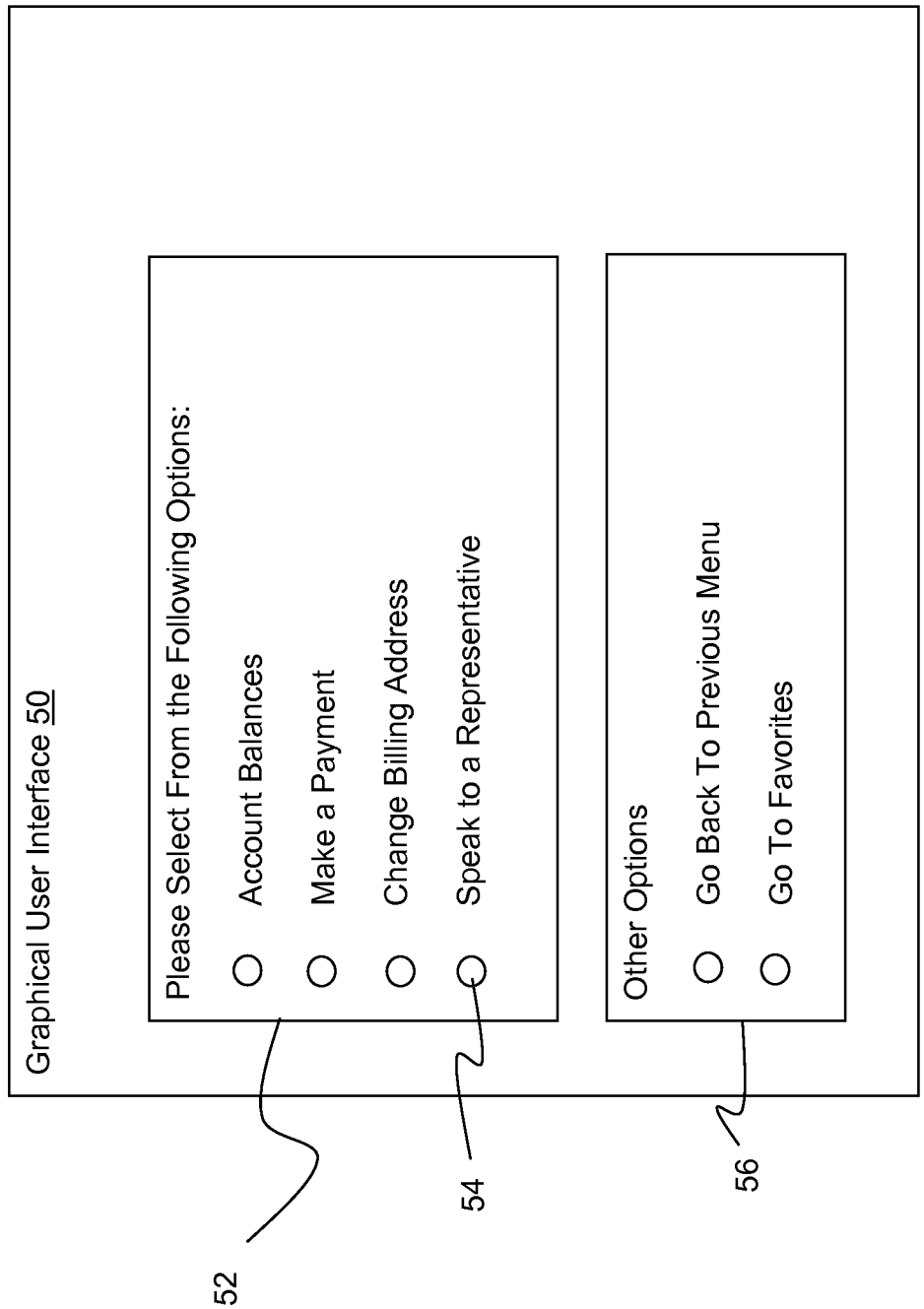
FIG. 2 depicts a GUI in accordance with an embodiment of the present invention.

Referring to FIG. 2, a graphic user interface 50 is shown including a first window 52 containing a set of dynamically generated options that reflect four choices broadcast by a VRU. Each choice includes a radio button 54 for graphically selecting one of the options. Upon selecting an option, the GUI 50 is refreshed with a new window containing information from the VRU, e.g., a different set of options, a form for entering data, requested information, etc. For instance, if the user 34 selected "account balances," a next window might display a form asking for account data or display a new set of options allowing the user 34 to select an account from a set of accounts. If the user 34 selected "speak to representative," the VoIP system 24 (FIG. 1) would initiate a call with the user 34.

In addition, GUI 50 may also display a second set of options 56. These options are not generated in response to broadcasts by the VRU, but are instead provided by the VRU proxy system 18 as additional features or options that might be useful for the user 34. For instance, this example displays the options "go back to previous menu" and "go to favorites." "Favorites" might refer to one or more nodes in the VRU that are commonly visited by users. For example, if "go to favorites" is selected, a set of favorite options with the VRU are displayed, thus providing a shortcut to the option, thus eliminating the need to navigate through multiple windows to find the option. Related case VOICE RESPONSE UNIT SHORTCUTTING, filed on Sep. 2, 2008, Ser. No. 12/202,682, describes such a process for implementing shortcuts within a VRU. It is understood that the GUI shown in FIG. 2 is for illustrative purposes only, and the presentation of information can vary without departing from the scope or intent of the invention.

Figure 3:
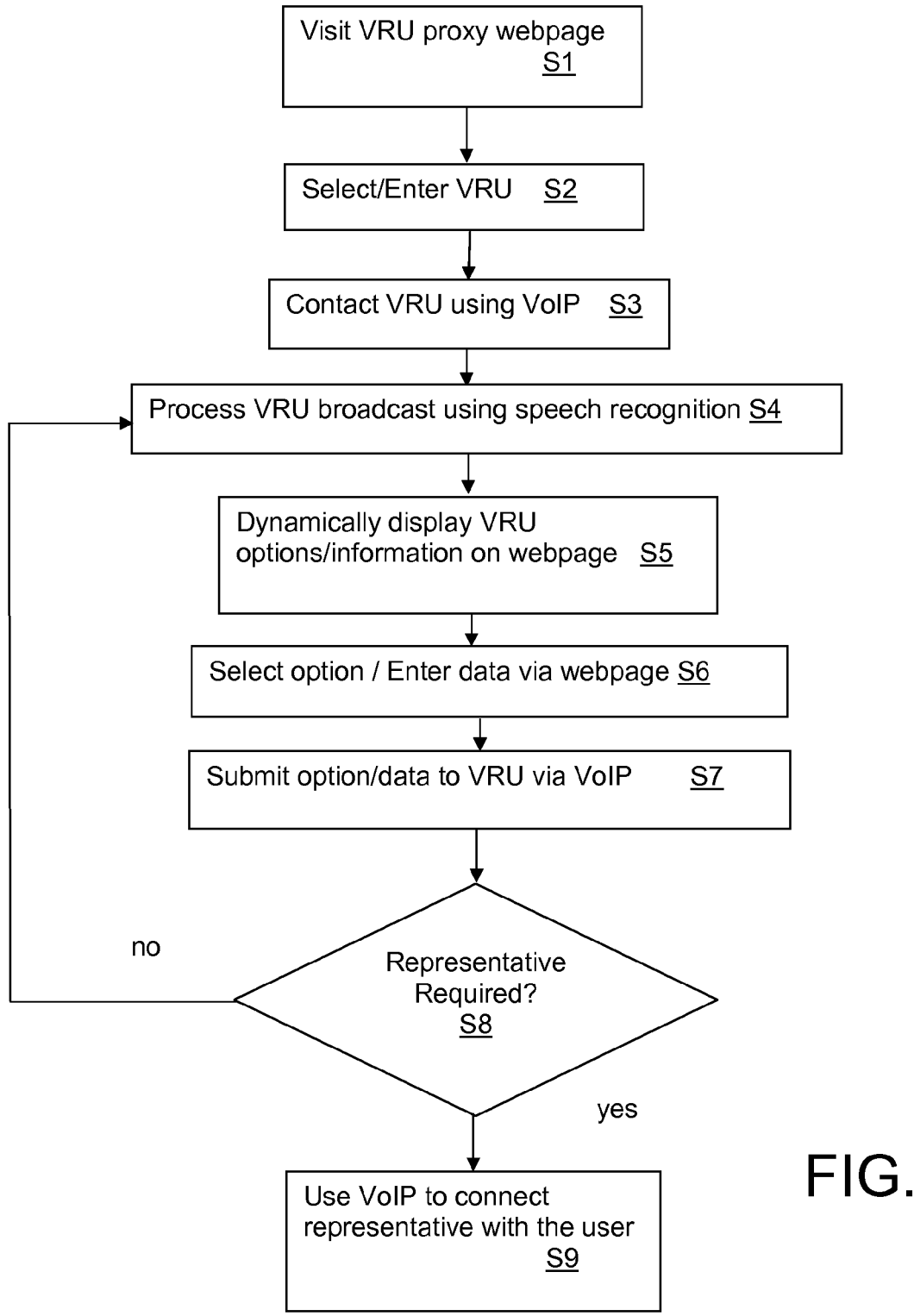
FIG. 3 depicts a flow chart showing a method in accordance with an embodiment of the present invention.

FIG. 3 depicts a flow diagram of a method of implementing VRU proxy system 18. At S1, a user visits a VRU proxy webpage, and selects or enters a targeted VRU at S2. At S3, the VRU is contacted using VoIP (or some other telephony technology). Speech recognition is then utilized to process the VRU broadcasts and save the information as text at S4. At S5, the broadcast VRU options and/or information is dynamically displayed on the webpage. At S6, the user selects an option or enters data (e.g., an account number) and at S7 the selected option or data is submitted to the VRU via the VoIP system. Next, an inquiry is made to determine if a representative is required at S8. If yes, the VoIP system is used to connect the user to the representative. If no, then control returns to S4, where speech recognition is again used to process the responsive broadcast by the VRU.

Referring again to FIG. 1, it is understood that computer system 10 may be implemented as any type of computing infrastructure. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising a VRU proxy system 18 could be created, maintained and/or deployed by a service provider that offers the functions described herein for customers. That is, a service provider could offer to deploy or provide VRU shortcuts as described above.

It is understood that in addition to being implemented as a system and method, the features may be provided as a program product stored on a computer-readable medium, which when executed, enables computer system 10 to provide a VRU proxy system 18. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 16 and/or a storage system.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A voice response unit (VRU) proxy system, comprising:
a processor;
a graphical user interface (GUI), in communication with the processor, for dynamically displaying information from a VRU and for receiving data from a user;
a system for initiating a first call with the VRU using voice over internet protocol (VOIP); and
a VRU interface system for transmitting data from the user to the VRU, and for using speech recognition to capture responsive broadcasts from the VRU for display within the GUI, wherein the user interacts with the VRU only via the GUI during the first call, and wherein an interaction with a live representative is optionally available in a second call, and wherein the graphical user interface includes a first segment containing a set of dynamically generated options that reflect choices broadcast by the VRU and a second segment containing a set of additional options that are unrelated to the broadcast by the VRU.

2. The VRU proxy system of claim 1, wherein the information from the VRU is selected from a group consisting of: a set of selectable options; a request for user data; and information requested by the user.

3. The VRU proxy system of claim 1, wherein the graphical user interface includes a webpage or a handheld device display.

4. The VRU proxy system of claim 1, further comprising a system for displaying VRU shortcuts in the GUI.

5. The VRU proxy system of claim 1, wherein the VoIP system initiates the second call to a phone associated with the user the live representative is presented by the VRU.

6. The VRU proxy system of claim 5, wherein the VoIP system includes a system for providing a status of the live representative before initiating the second call.

7. The VRU proxy system of claim 1, further comprising a TDD (Telecommunication Device for the Deaf) system.

8. The VRU proxy system of claim 1, wherein the VRU interface system includes a text to voice generation system for submitting user information to the VRU.

9. A non-transitory computer readable medium having a program product stored therein for providing a voice response unit (VRU) proxy system, comprising:
program code for dynamically displaying information from a VRU on a graphical user interface (GUI) and for receiving data from a user via the GUI;
program code for initiating a first call with the VRU using voice over internet protocol (VOIP);
program code for transmitting data from the user to the VRU; and program code for capturing responsive broadcasts from the VRU using speech recognition for display within the GUI, wherein the user is to interact with the VRU only via the GUI during the first call, and wherein an interaction with a live representative is optionally available in a second call, and wherein the graphical user interface includes a first segment containing a set of dynamically generated options that reflect choices broadcast by the VRU and a second segment containing a set of additional options that are unrelated to the broadcast by the VRU.

10. The computer readable medium of claim 9, wherein the information from the VRU is selected from a group consisting of: a set of selectable options; a request for user data; and information requested by the user.

11. The computer readable medium of claim 9, further comprising program code for initiating the second call to a phone associated with the user if the live representative is presented by the VRU.

12. The computer readable medium of claim 11, further comprising program code for providing a status of the live representative before initiating the second call.

13. The computer readable medium of claim 11, further comprising program code for interfacing with a TDD (Telecommunication Device for the Deaf) system.

14. The computer readable medium of claim 11, further comprising program code for displaying VRU shortcuts.

15. A method of providing a voice response unit (VRU) proxy, comprising:
- initiating a first call with a VRU using voice over internet protocol (VOIP);
- using speech recognition to collect responsive information broadcast from the VRU;
- dynamically displaying information from the VRU on a graphical user interface (GUI);
- receiving data from a user via the GUI; and
- transmitting the data from the user to the VRU, wherein the user interacts with the VRU only via the GUI during the first call, and wherein an interaction with a live representative is optionally available in a second call, and wherein the graphical user interface includes a first segment containing a set of dynamically generated options that reflect choices broadcast by the VRU and a second segment containing a set of additional options that are unrelated to the broadcast by the VRU.

16. The method of claim 15, wherein the information from the VRU is selected from a group consisting of: a set of selectable options; a request for user data; and information requested by the user.

17. The method of claim 15, further comprising initiating the second call to a phone associated with the user if the live representative is presented by the VRU.

18. The method of claim 17, further comprising providing a status in the GUI of the live representative before initiating the second call.

19. The method of claim 15, further comprising interfacing with a TDD (Telecommunication Device for the Deaf) system.

20. A method for deploying a system for providing a voice response unit (VRU) proxy, comprising:
- providing a computer infrastructure being operable to:
  - dynamically display information from a VRU on a graphical user interface (GUI) and receive data from a user via the GUI;
  - initiate a call with the VRU using voice over internet protocol (VOIP);
  - transmit data from the user to the VRU; and
  - capture responsive broadcasts from the VRU using speech recognition for display within the GUI, wherein the user interacts with the VRU only via the GUI during the first call, and wherein an interaction with a live representative is optionally available in a second call, and wherein the graphical user interface includes a first segment containing a set of dynamically generated options that reflect choices broadcast by the VRU and a second segment containing a set of additional options that are unrelated to the broadcast by the VRU.

* * * * *